United States Patent Office 2,826,584
Patented Mar. 11, 1958

2,826,584
PYRIDYLETHYLPENTACHLOROPHENYL SULFIDES

Francis E. Cislak, Indianapolis, Ind., assignor to Reilly Tar & Chemical Corporation, Indianapolis, Ind., a corporation of Indiana No Drawing. Application April 18, 1957
Serial No. 653,536

6 Claims. (Cl. 260—294.8)

This invention relates to a new class of compounds and to the process of making them. More particularly, it relates to pyridylethylpentachlorophenyl sulfides formed by reacting a vinylpyridine with pentachlorobenzenethiol, which compounds have the following general formula:

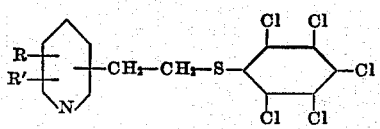

where R and R' are hydrogen or alkyl.

In general, the compounds of my invention may be prepared by reacting a vinylpyridine, or a compound which upon dehydration is converted into a vinylpyridine, with pentachlorobenzenethiol. The reaction is advantageously carried out by heating the vinylpyridine with the pentachlorobenzenethiol at an elevated temperature. A solvent, such for example as toluene or pyridine, may be used in carrying out the reaction. Also, a catalyst may be used.

The pyridylethylpentachlorophenyl sulfides are useful as inhibitors for the pickling of steel. Some of them possess fungicidal properties, and may be useful as fungicides either by themselves or in admixture with diluents; some of them possess insecticidal properties and may be useful as insecticides, either alone or in admixture with diluents; some of the acid salts of my compounds may be useful as herbicides.

The following specific examples of the manner of forming my new compounds are given by way of illustration. The parts are by weight.

EXAMPLE 1

*4-pyridylethylpentachlorophenyl sulfide*

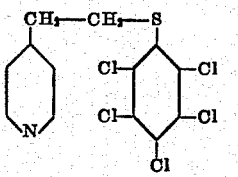

To a solution of 51 parts of 4-vinylpyridine in 51 parts of pyridine are added 150 parts of pentachlorobenzenethiol and one part of sodium methoxide as a catalyst. The resulting mixture is heated under reflux conditions for about 16 hours. After the reflux period, the mixture is cooled, washed with water; the water wash is discarded. The new compound 4-pyridylethylpentachlorophenyl sulfide is recovered from the water insoluble portion in any convenient manner. One way of recovering the 4-pyridylethylpentachlorophenyl sulfide is as follows. The water insoluble portion is subjected to vacuum distillation to remove any unreacted starting materials. The residue remaining after the starting materials have distilled over contains the 4-pyridylethylpentachlorophenyl sulfide together with a small amount of polymerized 4-vinylpyridine. For most purposes this residue may be used as is. If the pure compound is desired, the residue may be recrystallized.

EXAMPLE 2

*5-(2-methylpyridyl)ethylpentachlorophenyl sulfide*

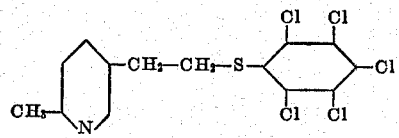

To 60 parts of 2-methyl-5-vinyilpyridine there are added about 140 parts of pentachlorobenzenethiol and one part of sodium methoxide as a catalyst. The resulting mixture is heated at a temperature of 140–160° C. for about twelve hours. Then the reaction mixture is cooled, washed with water, and the water wash is discarded. The water-insoluble portion is subjected to vacuum distillation to remove water and unreacted starting materials. The 5 - (2 - methylpyridyl)ethylpentachlorophenyl sulfide remains as a residue. It is useful for many purposes in its semi-pure form. If need be, the compound may be further purified by fractional crystallization.

EXAMPLE 3

*2-pyridylethylpentachlorophenyl sulfide*

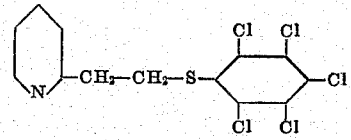

The procedure of Example 1 is repeated with the exception that 2-vinylpyridine is used in place of the 4-vinylpyridine.

EXAMPLE 4

*2-(5-ethylpyridyl)ethylpentachlorophenyl sulfide*

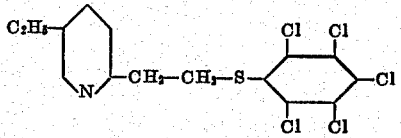

The procedure of Example 2 is repeated wtih the exception that 2-vinyl-5-ethylpyridine is used in place of the 2-methyl-5-vinylpyridine.

I claim as my invention:

1. Pyridylethylpentachlorophenyl sulfides having the following general formula:

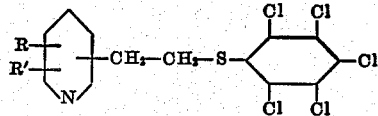

where R and R' are one of the group consisting of hydrogen and lower alkyl.
2. 4-pyridylethylpentachlorophenyl sulfide.
3. 2-pyridylethylpentachlorophenyl sulfide.
4. 2-(5-ethylpyridyl)ethylpentachlorophenyl sulfide.
5. 5-(2-methylpyridyl)ethylpentachlorophenyl sulfide.
6. The process of preparing the compounds of claim 1 which comprises heating a mixture of a vinylpyridine with pentachlorobenzene thiol.

No references cited.